(12) United States Patent
Kim et al.

(10) Patent No.: US 8,885,095 B2
(45) Date of Patent: Nov. 11, 2014

(54) ZOOM ILLUMINATING SYSTEM AND IMAGING APPARATUS EMPLOYING THE SAME

(75) Inventors: Ji-sung Kim, Changwon (KR); Abe Tetsuya, Changwon (KR); Q-Taek Park, Changwon (KR); Chang-Yeon Kim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 120 days.

(21) Appl. No.: 13/598,879

(22) Filed: Aug. 30, 2012

(65) Prior Publication Data

US 2013/0128096 A1 May 23, 2013

(30) Foreign Application Priority Data

Nov. 21, 2011 (KR) ........................ 10-2011-0121733

(51) Int. Cl.
  *H04N 5/222* (2006.01)
  *G02B 15/14* (2006.01)
  *G02B 19/00* (2006.01)

(52) U.S. Cl.
  CPC ............ *G02B 15/14* (2013.01); *G02B 19/0014* (2013.01); *G02B 19/0061* (2013.01); *G02B 19/009* (2013.01); *G02B 19/00* (2013.01)
  USPC .......................................... 348/371; 348/373

(58) Field of Classification Search
  USPC ..................................... 348/371, 373; 396/61
  See application file for complete search history.

(56) References Cited

U.S. PATENT DOCUMENTS

| 4,423,940 | A * | 1/1984 | Kashihara et al. ............... 396/62 |
| 2004/0037549 | A1* | 2/2004 | Yano .............................. 396/175 |
| 2006/0045501 | A1* | 3/2006 | Liang et al. ..................... 396/62 |
| 2006/0055818 | A1 | 3/2006 | Hwang |
| 2006/0114453 | A1* | 6/2006 | Goldenshtein et al. .... 356/237.1 |
| 2012/0013745 | A1 | 1/2012 | Kang et al. |

FOREIGN PATENT DOCUMENTS

| JP | 8-076017 A | 3/1996 |
| JP | 2002-236307 A | 8/2002 |
| KR | 10-0518250 A | 10/2005 |
| KR | 10-2010-0109064 A | 10/2010 |
| KR | 10-1013466 B1 | 2/2011 |
| KR | 10-2011-0057083 A | 5/2011 |
| KR | 10-2011-0094377 A | 8/2011 |
| WO | 2006/031037 A1 | 3/2006 |

OTHER PUBLICATIONS

Communication dated Sep. 17, 2012 issued by the Korean Intellectual Patent Office in counterpart Korean Patent Application No. 10-2011-0121733.
Communication from the European Patent Office issued Feb. 5, 2013 in counterpart European Application No. 12193481.4.

* cited by examiner

*Primary Examiner* — Gevell Selby
(74) *Attorney, Agent, or Firm* — Sughrue Mion, PLLC

(57) ABSTRACT

A zoom illuminating system and an imaging apparatus including the same are provided. The imaging apparatus includes: the zoom illuminating system; a zoom lens system including a plurality of lens groups and zooming an image of an object as a distance between the plurality of lens groups varies.

14 Claims, 4 Drawing Sheets

ZOOM ILLUMINATING SYSTEM AND IMAGING APPARATUS EMPLOYING THE SAME

CROSS-REFERENCE TO RELATED PATENT APPLICATION

This application claims priority from Korean Patent Application No. 10-2011-0121733, filed on Nov. 21, 2011, in the Korean Intellectual Property Office, the disclosure of which is incorporated herein by reference in its entirety.

BACKGROUND

1. Field

Apparatuses consistent with exemplary embodiments relate to a zoom illuminating system capable of adjusting illumination according to imaging conditions, and an imaging apparatus employing the same.

2. Description of the Related Art

Recently, monitoring cameras for closed circuit television (CCTV) have been widely used in residential areas, commercial properties such as department stores and banks, and factory sites.

A fixed focus lens having a fixed focal length or a zoom lens having a zoom function is used as an imaging lens of a monitoring camera, and infrared illumination for night photographing is also used in a monitoring camera.

When a fixed focus lens is used, the fixed focus lens is a wide-angle lens having a large diameter in order to monitor a dark place with a wide range. Also, an illumination unit having a fixed illumination range is generally employed, and the illumination unit includes a plurality of light sources to illuminate a subject at night.

The monitoring camera using the zoom lens requires illumination covering a wide photographing range from a wide angle position to a telephoto position of the zoom lens. If an illumination unit having a fixed illumination range is used, light illumination efficiency is low since an appropriate illumination range for a photographing range is not used. For example, if a wide view angle illumination is used at a telephoto position where only illumination in a narrow view angle is required, most of the illumination is squandered. Therefore, there is a need for a light source having a wide illumination range and a light source having a narrow illumination range used together to cover a wide photographing range from a wide angle position to a telephoto position.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a zoom illumination system having an adjustable illumination range, and an imaging apparatus including the same.

According to an aspect of an exemplary embodiment, there is provided a zoom illuminating system having an adjustable illumination range and including: a light source; and a lens unit including at least one lens, wherein a distance from the light source to the at least one lens is variable.

The light source may include at least one light emitting device emitting light in an infrared band.

The lens unit may include a positive lens, wherein a distance from the light source to the positive lens may be variable.

The lens unit may include: a first lens; and a second lens disposed between the first lens and the light source, wherein the illumination range may be adjusted by adjusting a distance between the first and second lenses.

The first lens may be fixed and the second lens may be moved to adjust the distance between the first and second lenses.

The first lens may be fixed and the light source may move together with the second lens.

At least one of the first and second lenses may be a positive lens.

The lens unit may include at least one aspherical surface. The second lens may be a spherical lens.

According to another aspect of an exemplary embodiment, there is provided an imaging apparatus including: the zoom illuminating system; a zoom lens system including a plurality of lens groups and zooming an image of an object as a distance between the plurality of lens groups varies; an image pickup device changing an optical image formed by the zoom lens system to an electric signal; and a control unit controlling zooming of the zoom lens system to be interlocked with adjusting of an illumination range of the zoom illuminating system.

Magnification of the zoom lens system may be equal to or higher than 2.

BRIEF DESCRIPTION OF THE DRAWINGS

The above and other aspects will become more apparent by describing in detail exemplary embodiments thereof with reference to the attached drawings, in which.

DETAILED DESCRIPTION

Hereinafter, exemplary embodiments will be described in detail with reference to attached drawings. In drawings, sizes of elements may be exaggerated for clarity.

Figure 1:
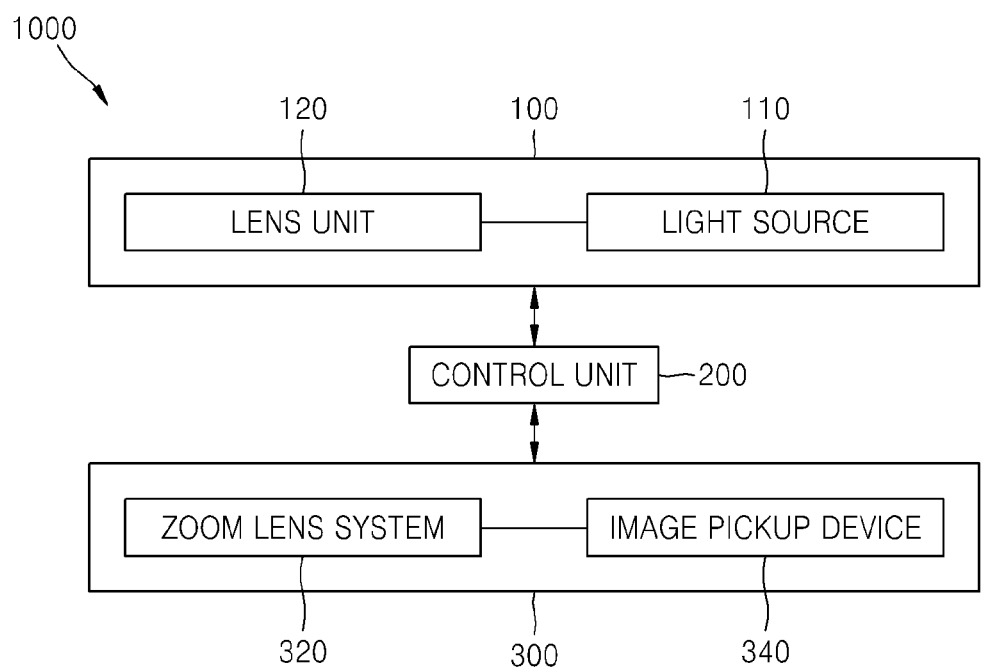
FIG. 1 is a block diagram schematically illustrating an imaging apparatus according to an embodiment.

FIG. 1 is a block diagram schematically illustrating an imaging apparatus 1000 according to an exemplary embodiment.

The imaging apparatus 100 includes a zoom illuminating system 100 having a variable illumination range, an imaging unit 300 including a zoom lens system 320, and a control unit 200 controlling zooming of the zoom lens system 320 to be interlocked with adjusting of the illumination range of the zoom illuminating system 100.

In detail, the zoom illuminating system 100 includes a light source 110 and a lens unit 120 including at least one lens. A distance from the light source 110 to the at least one lens is variable to adjust an illumination range of light emitted from the light source 110.

A light emitting device emitting light in an infrared band, such as a light emitting diode (LED) or laser diode (LD) emitting light in a wavelength band of about 830 to 960 nm, may be employed as the light source 110. One or more light sources 110 may be used.

An angle of beam spread of a light emitting device employed as the light source 110 is generally at least about 80°, and the lens unit 120 includes at least one positive lens to realize an illumination range in a view angle narrower than the angle of beam spread from such a light source 110. The illumination range of light emitted from the light source 110 varies according to photographing conditions. For example, the lens unit 120 may be operated such that the illumination range of a short distance having a wide angle of beam spread is formed according to photographing conditions at the wide angle position. On the other hand, the illumination range of a long distance having a narrow angle of beam spread is formed according to photographing conditions at the telephoto position.

The imaging unit 300 includes the zoom lens system 320 and an image pickup device 340. The zoom lens system 320 includes a plurality of lens groups, and an image of an object may be zoomed as a distance between the lens groups varies. A number of lens groups forming the zoom lens system 320, or a type or number of lenses forming each lens group may be variously selected considering the optical performances such as magnification and aberration. The zoom lens system 320 may have at least 2× zoom magnification. The image pickup device 340 converts an optical image formed by the zoom lens system 320 to an electric signal, and may be a charged coupled device (CCD) or a complementary metal-oxide semiconductor (CMOS).

The control unit 200 controls zooming of the zoom lens system 320 and adjusting of an illumination range of the zoom lens system 320 to be interlocked with each other. The control unit 200 adjusts zoom magnifications, i.e., drives the zoom lens system 320 according to a command of a user, and drives the zoom illuminating system 100 to form a corresponding illumination range. In other words, the zoom lens system 320 is driven to have an illumination range having a wide angle of beam spread when the zoom lens system 320 is driven to have an optical arrangement corresponding to the wide angle position, and to have an illumination range having a narrow angle of beam spread when the zoom lens system 320 is driven to have an optical arrangement corresponding to the telephoto position. An angle of beam spread of light is widened at the wide angle position to increase an illumination area, and thus, illumination uniformity is obtained. An angle of beam spread of light is narrowed at the telephoto position so as to concentrate the light in a narrow area, and thus, illumination intensity is increased.

Also, in order to adjust illumination, the imaging apparatus 1000 may include an increased number of light sources 110 and/or a plurality of zoom illuminating systems 100.

Hereinafter, embodiments of a zoom illuminating system employable by the imaging apparatus 1000 of FIG. 1 will be described together with lens data. A definition of an aspherical surface in the embodiments is as follows.

[Equation 1]

$$x = \frac{c'y^2}{1 + \sqrt{1 - (K+1)c'^2 y^2}} + Ay^4 + By^6 + Cy^8 + Dy^{10} \quad (1)$$

where, x denotes a distance from a vertex of a lens in an optical axis direction, y denotes a distance in a direction perpendicular to an optical axis, K denotes a conic constant, A, B, C, and D denote aspherical surface coefficients, and c' denotes an inverse number (1/R) of a radius of curvature at the vertex of lens.

In each lens data, D2 denotes a variable distance between lenses, Asphere denotes an aspherical surface, and Sphere denotes a spherical surface. Units for radius of curvature, thickness or distance, effective diameter, and focal length are in mm. A refractive index relates to light in a wavelength band of e-ray.

Figure 2:
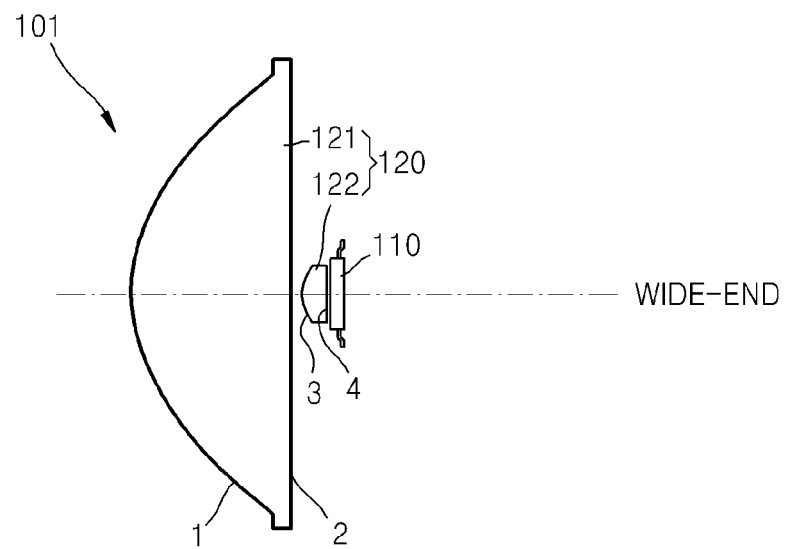
FIG. 2 is views of optical arrangements of a zoom illuminating system employed in the imaging apparatus of FIG. 1, according to an embodiment, the optical arrangements respectively corresponding to a wide angle position and telephoto position of a zoom lens system of the imaging apparatus of FIG. 1.
Figure 2:
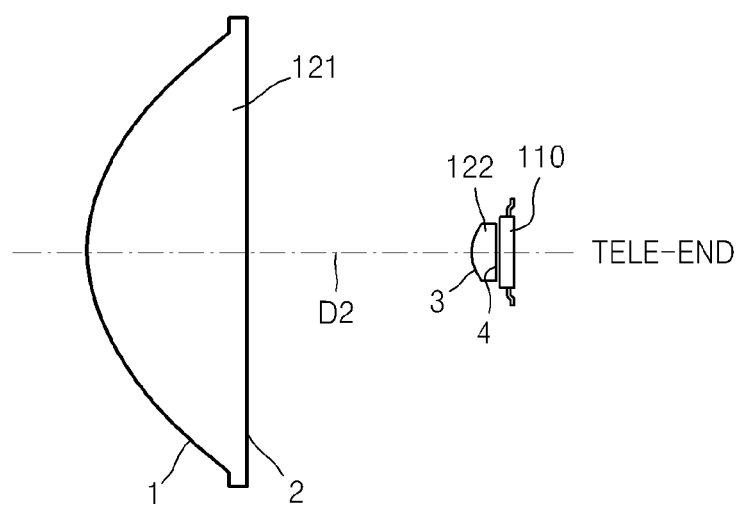

FIG. 2 shows views of optical arrangements of the zoom illuminating system 101 employed in the imaging apparatus 1000 of FIG. 1. According to the current exemplary embodiment, the optical arrangements respectively correspond to a wide angle position and a telephoto position of the zoom lens system 320 of the imaging apparatus 1000.

The zoom illuminating system 101 includes a first lens 121, a second lens 122, and the light source 110, wherein the second lens 122 is disposed between the first lens 121 and the light source 110. At least any one of the first and second lenses 121 and 122 may be a lens having positive refractive power, and in the current embodiment, both first and second lenses 121 and 122 have positive refractive power. A focal length and view angle of the lens unit 120 vary and an illumination range is adjusted by adjusting a distance D2 between the first and second lenses 121 and 122. In the current embodiment, the first lens 121 is fixed and the second lens 122 moves along an optical axis to adjust the distance D2 from the first lens 121, and here, the light source 110 moves together with the second lens 122.

Lens data is shown in Tables 1 through 3.

TABLE 1

| Surface # | Type of Surface | Radius of curvature (mm) | Thickness or distance (mm) | Refractive index | Effective diameter (mm) | Focal length (mm) |
|---|---|---|---|---|---|---|
| 1 | Asphere | −19.1 | 16.7 | 1.523 | 23 | 36.5191 |
| 2 | Sphere | 1.00E+18 | D2 | | 23 | |
| 3 | Sphere | −4.71 | 2.5 | 1.785 | 3 | 6.00214 |
| 4 | Sphere | 1.00E+18 | | | 3 | |

TABLE 2

| Surface # | A | B | K |
|---|---|---|---|
| 1 | −2.9e−006 | −2.885e−009 | −0.7100 |

TABLE 3

| | D2 (mm) | Half view angle (°) |
|---|---|---|
| Wide angle | 1.13 | 39.5 |
| Telephoto | 22.22 | 2.1 |

Figure 3:
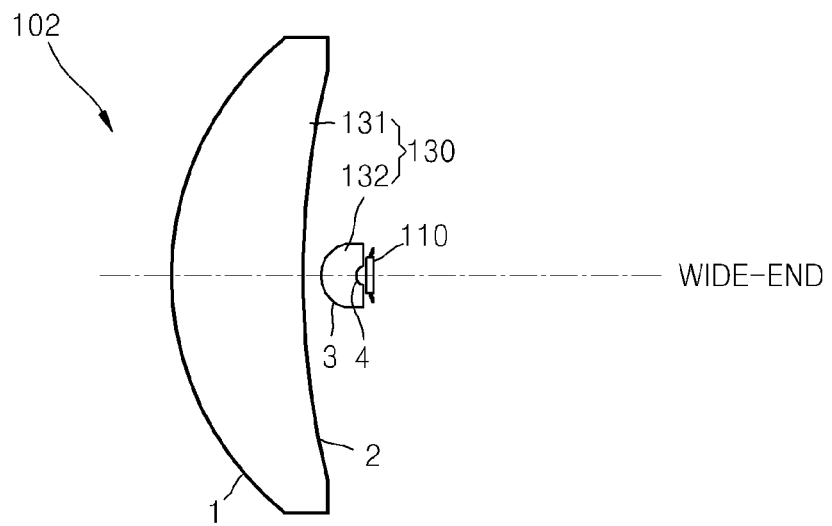
FIG. 3 is views of optical arrangements of a zoom illuminating system employed in the imaging apparatus of FIG. 1, according to another embodiment, the optical arrangements respectively corresponding to a wide angle position and telephoto position of a zoom lens system of the imaging apparatus of FIG. 1.
Figure 3:
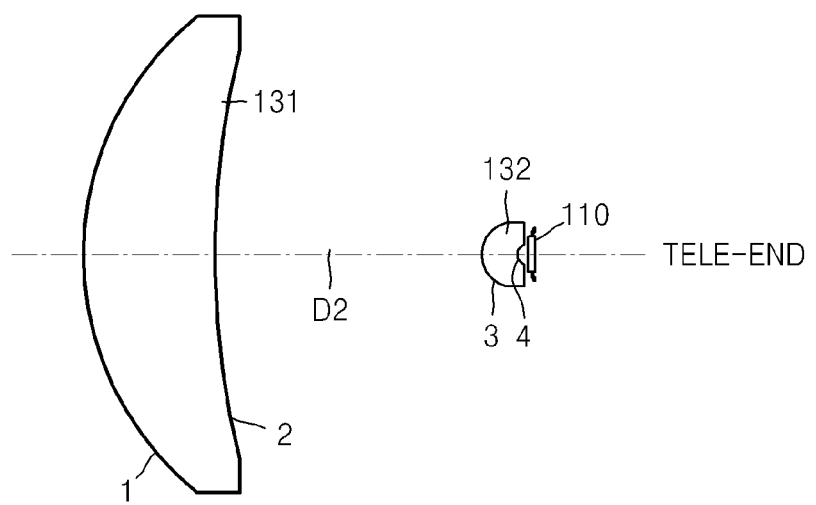

FIG. 3 shows views of optical arrangements of a zoom illuminating system 102 employed in the imaging apparatus 1000 of FIG. 1. According to another exemplary embodiment, the optical arrangements respectively correspond to a wide angle position and telephoto position of the zoom lens system 320 of the imaging apparatus 1000.

The zoom illuminating system 102 includes a lens unit 130 including a first lens 131 and a second lens 132, and the light source 110, wherein the second lens 132 is disposed between the first lens 131 and the light source 110. The first lens 131 has positive refractive power, and has a meniscus shape, a surface of the first lens 131 facing the light source 110 being concave. The second lens 132 has negative refractive power, and has a meniscus shape, a surface of the second lens 132 facing the light source 110 being concave.

TABLE 4

| Surface # | Type of Surface | Radius of curvature (mm) | Thickness or Distance (mm) | Refractive index | Effective diameter (mm) | Focal length (mm) |
|---|---|---|---|---|---|---|
| 1 | Asphere | 64.4798 | 30 | 1.516798 | 52 | 175.794 |
| 2 | Sphere | 193.7111 | D2 | | 47.5 | |
| 3 | Sphere | 6.7851 | 9.54 | 1.516798 | 6.58 | −106.184 |
| 4 | Sphere | 3.1668 | | | 2.15 | |

TABLE 5

| # | A | B | C | K |
|---|---|---|---|---|
| 1 | 1.64741e−009 | −1.25884e−012 | 1.52640694e−015 | −0.4615 |

TABLE 6

| | D2 (mm) | Half view angle (°) |
|---|---|---|
| Wide angle | 3 | 20.556 |
| Telephoto | 88.86 | 0.966 |

Figure 4:
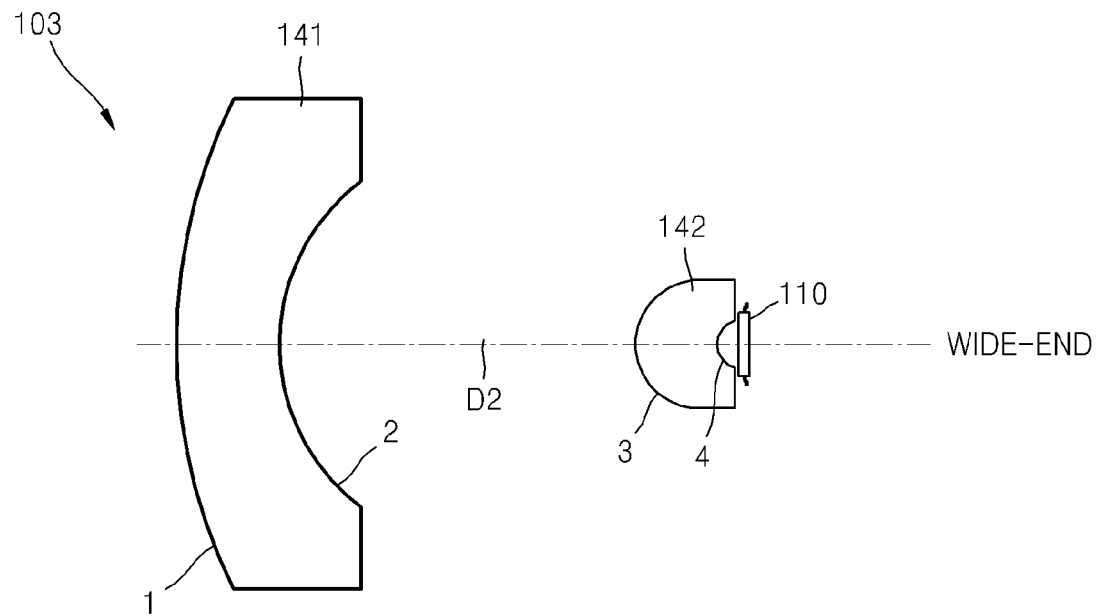
FIG. 4 is views of optical arrangements of a zoom illuminating system employed in the imaging apparatus of FIG. 1, according to another exemplary embodiment, the optical arrangements respectively corresponding to a wide angle position and telephoto position of a zoom lens system of the imaging apparatus of FIG. 1.
Figure 4:
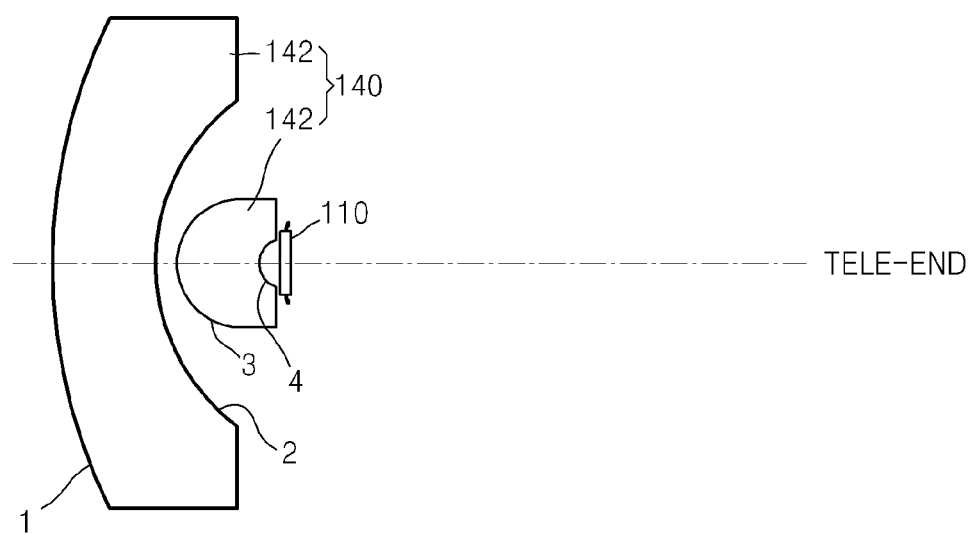

FIG. 4 shows views of optical arrangements of a zoom illuminating system 103 employed in the imaging apparatus 1000 of FIG. 1. According to another exemplary embodiment, the optical arrangements respectively correspond to a wide angle position and telephoto position of the zoom lens system 320 of the imaging apparatus 1000.

The zoom illuminating system 103 includes a lens unit 140 including a first lens 141 and a second lens 142, and the light source 110, wherein the second lens 142 is disposed between the first lens 141 and the light source 110. The first lens 141 has negative refractive power, and has a meniscus shape, a surface of the first lens 141 facing the light source 110 being concave. The second lens 142 has positive refractive power, and has a meniscus shape, a surface of the second lens 142 facing the light source 110 being concave.

TABLE 7

| Surface # | Type of Surface | Radius of curvature (mm) | Thickness or distance (mm) | Refractive index | Effective diameter (mm) | Focal length (mm) |
|---|---|---|---|---|---|---|
| 1 | Asphere | 58.2121 | 10 | 1.516798 | 52 | −70.9663 |
| 2 | Sphere | 21.0185 | D2 | | 47.5 | |
| 3 | Sphere | 6.3805 | 9.847 | 1.516798 | 6.58 | 25.652 |
| 4 | Sphere | 5.9661 | | | 2.15 | |

TABLE 8

| # | A | B | C | K |
|---|---|---|---|---|
| 1 | 1.0879e−008 | −8.3994e−011 | 1.0160e−014 | −0.288337 |

TABLE 9

| | D2 (mm) | Half view angle (°) |
|---|---|---|
| Wide angle | 32.8570 | 35.70669 |
| Telephoto | 2.70815 | 25.11483 |

As such, the zoom illuminating systems 101 through 103 that may adjust the illumination ranges of light emitted from the light source 110 according to wide angle position and telephoto position photographing conditions are respectively realized according to the lens units 120 through 140 according to the exemplary embodiments.

In the above embodiments, the lens units 120, 130 and 140 include two lenses, but alternatively, the lens units 120, 130 and 140 may include only one lens, wherein a relative distance from the light source 110 to the lens is variable, or may include at least three lenses.

Optical efficiency of the light source is high since the zoom illuminating system can illuminate a required range according to photographing conditions by adjusting an angle of beam spread of light in the light source from a short distance to a long distance.

Also, since a wide view angle range is illuminated in a short distance and a narrow view angle range is illuminated in a long distance, the optical efficiency of the light source is increased, and thus, a visual range at night can be increased even with a low number of light sources.

Accordingly, the imaging apparatus employing such a zoom illuminating system can efficiently photograph an object in a dark environment, and is suitable for a night monitoring system.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in a descriptive sense only and not for purposes of limitation.

What is claimed is:

1. A zoom illuminating system comprising:
   a light source; and
   a lens unit comprising a first lens and a second lens disposed between the first lens and the light source,
   wherein the first lens is fixed and the second lens is configured to move to adjust distance between the first and second lenses, and an illumination range of light is adjusted by adjusting a distance between the first and second lenses
   wherein the first lens is fixed and the light source moves together with the second lens.

2. The zoom illuminating system of claim 1, wherein the light source comprises at least one light emitting device emitting the light in an infrared band.

3. The zoom illuminating system of claim 1, wherein the lens unit comprises a positive lens, and
   wherein a distance from the light source to the positive lens is variable.

4. The zoom illuminating system of claim 1, wherein at least one of the first and second lenses is a positive lens.

5. The zoom illuminating system of claim 1, wherein the lens unit comprises at least one aspherical surface.

6. The zoom illuminating system of claim 1, wherein the second lens is a spherical lens.

7. An imaging apparatus comprising:
   a zoom illuminating system of claim 1;
   a zoom lens system comprising a plurality of lens groups;
   an image pickup device which changes an optical image formed by the zoom lens system to an electric signal; and
   a control unit which controls the zooming of the zoom lens system to be interlocked with adjusting of the illumination range of the zoom illuminating system.

8. The imaging apparatus of claim 7, wherein magnification of the zoom lens system is greater than or equal to two (2).

9. The imaging apparatus of claim 7, wherein the light source of the zoom illuminating system comprises at least one light emitting device emitting the light in an infrared band.

10. The imaging apparatus of claim 7, wherein the lens unit of the zoom illuminating system comprises a positive lens, and
    wherein a distance from the light source to the positive lens is variable.

11. The imaging apparatus of claim 7, wherein at least one of the first and second lenses is a positive lens.

12. The imaging apparatus of claim 7, wherein the lens unit comprises at least one aspherical surface.

13. The imaging apparatus of claim 12, wherein the second lens is a spherical lens.

14. The imaging apparatus of claim 7, wherein the zoom lens system is driven to have an illumination range having a wide angle of beam spread when the zoom lens system is driven to have an optical arrangement corresponding to a wide angle position, and to have an illumination range having a narrow angle of beam spread when the zoom lens system is driven to have an optical arrangement corresponding to a telephoto position.

* * * * *